Nov. 26, 1929.                    C. ARNESEN                    1,737,400
                            SPEED REGISTERING DEVICE
                 Original Filed May 10, 1923    5 Sheets-Sheet 1
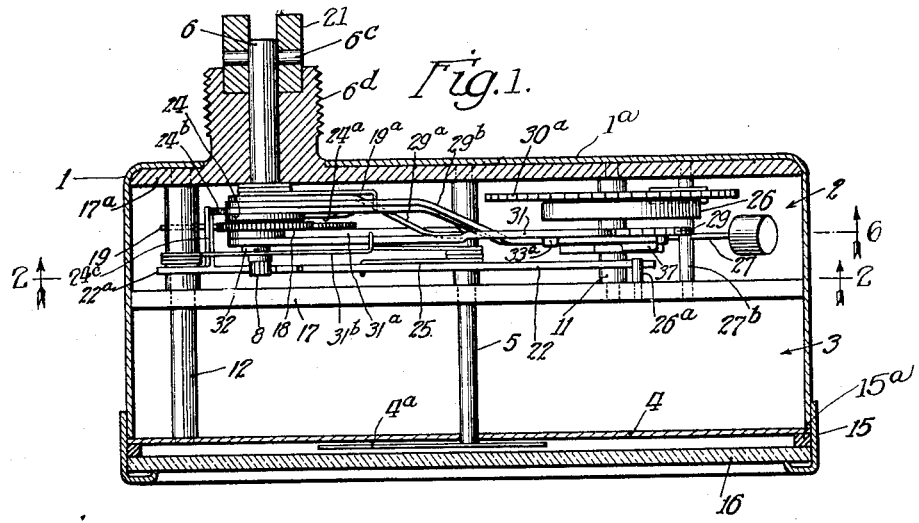
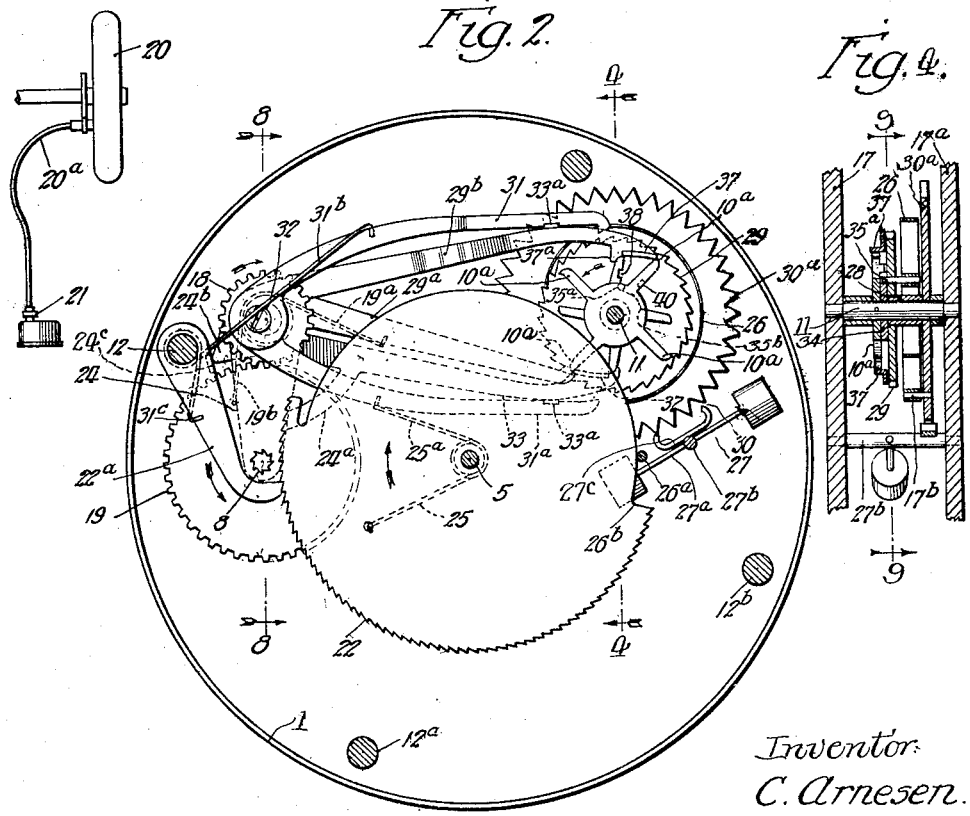
Inventor:
C. Arnesen.

Nov. 26, 1929.  C. ARNESEN  1,737,400
SPEED REGISTERING DEVICE
Original Filed May 10, 1923  5 Sheets-Sheet 2

Inventor:
C. Arnesen.

Nov. 26, 1929.  C. ARNESEN  1,737,400
SPEED REGISTERING DEVICE
Original Filed May 10, 1923   5 Sheets-Sheet 3
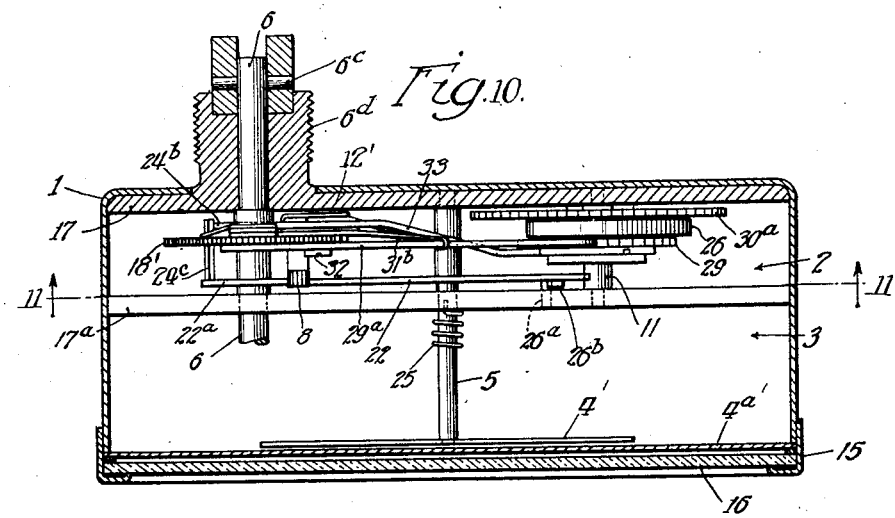
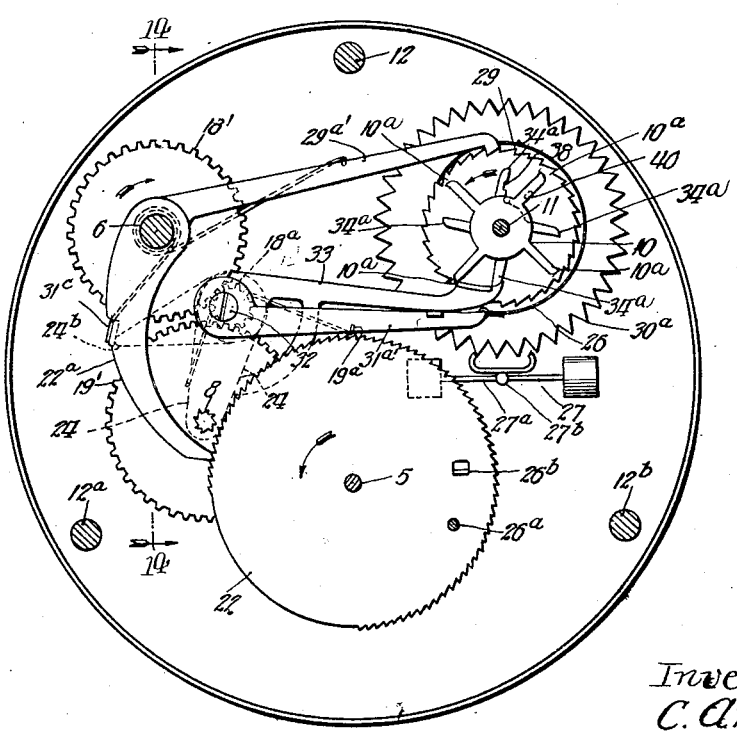
Inventor:
C. Arnesen.

Nov. 26, 1929.  C. ARNESEN  1,737,400
SPEED REGISTERING DEVICE
Original Filed May 10, 1923  5 Sheets-Sheet 4
Fig. 12.
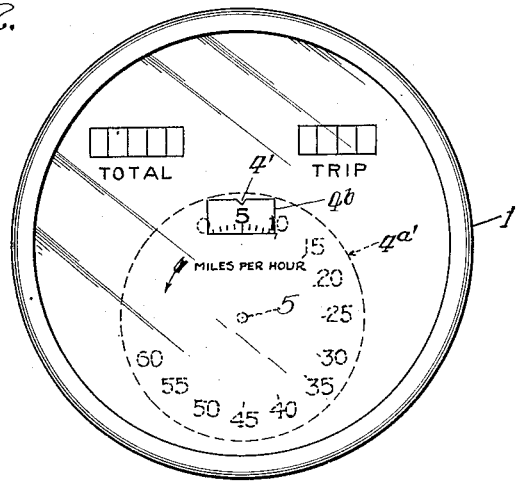
Fig. 13.
Fig. 14.
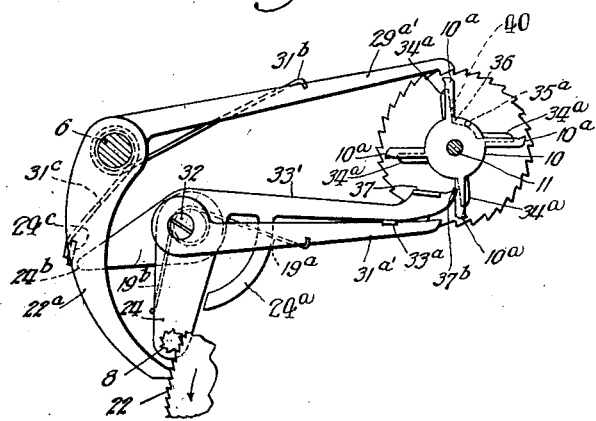
Inventor:
C. Arnesen.

Nov. 26, 1929.  C. ARNESEN  1,737,400
SPEED REGISTERING DEVICE
Original Filed May 10, 1923  5 Sheets-Sheet 5

Inventor:
C. Arnesen,

Patented Nov. 26, 1929

1,737,400

UNITED STATES PATENT OFFICE

CHARLOTTE ARNESEN, OF CHICAGO, ILLINOIS

SPEED-REGISTERING DEVICE

Application filed May 10, 1923, Serial No. 637,926. Renewed April 22, 1929.

In one aspect of the invention it has for its aim the provision of a speed registering device of a novel and advantageous character of the type usually termed speedometers and commonly used for registering the speed of travel of machines or vehicles such as automobiles, aeroplanes, boats and the like.

Devices of the type referred to as now manufactured and sold, employ in all cases of which I am aware, non-positive actuating forces such, for example, as air under pressure and magnetism which are subject to change under varying weather conditions and otherwise are more or less undependable, where accurate results are necessary or desirable.

The primary object of my invention is to produce a speedometer of a thoroughly practical character, in which the speed registering or indicating mechanism is arranged to be actuated through connection with a source of power which is positive in character.

In carrying out my invention as thus generally stated, I provide in combination with a constantly rotating element, means for periodically connecting an indicating device to said element for movement thereby, said means being under the control of a governor mechanism of an advantageous character.

A further and important object of my invention is to provide a novel and advantageous spring winding means for speedometers and other spring-actuated instruments, having means operable to impart successive power impulses each of a definite predetermined value to the winding of the actuating spring.

Still another object of my invention is to provide means which is operable upon a stoppage of the drive means and also in the event of a reversal thereof as may occur when the vehicle to which it is applied is propelled backwardly, to effect a storage of power in the spring, by preventing a de-energization of the same.

A general object of the invention and one of substantial importance is to provide a speed registering device of the character referred to having a minimum number of parts and capable of being manufactured on a very economical basis.

In the accompanying drawings forming part hereof, Figure 1 is a horizontal sectional view through a device constructed in accordance with my invention.

Fig. 2 is a vertical sectional view taken on line 2—2 of Fig. 1.

Fig. 3 is a fragmentary elevational view partially diagrammatic in character showing the device and its connection with the front wheel of a motor vehicle.

Fig. 4 is a fragmentary vertical sectional view taken in the plane of line 4—4 of Fig. 2.

Fig. 10 is a central horizontal sectional view illustrating a modified form of the device.

Fig. 11 is a vertical sectional view taken in the plane of line 11—11 of Fig. 10.

Fig. 12 is a front elevational view of this form of the device.

Fig. 13 is a fragmentary vertical sectional view taken substantially in the plane of line 11—11 of Fig. 10 and illustrating the operative connection between the drive element and the main element of the governor mechanism in the modified form shown in Figs. 10 and 11.

Fig. 14 is a fragmentary vertical sectional view taken substantially in the plane of line 14—14 of Fig. 11.

Figure 5:
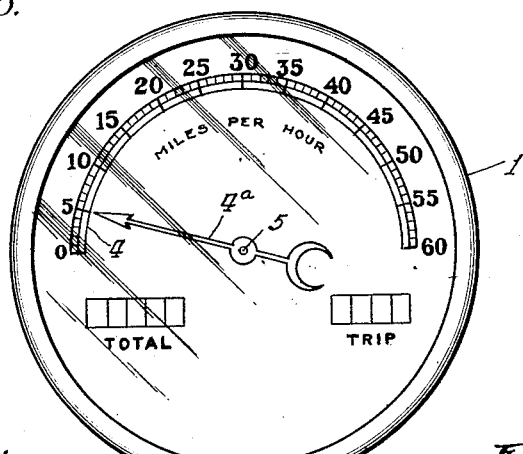
Fig. 5 is a front elevational view of the device.
Figure 6:
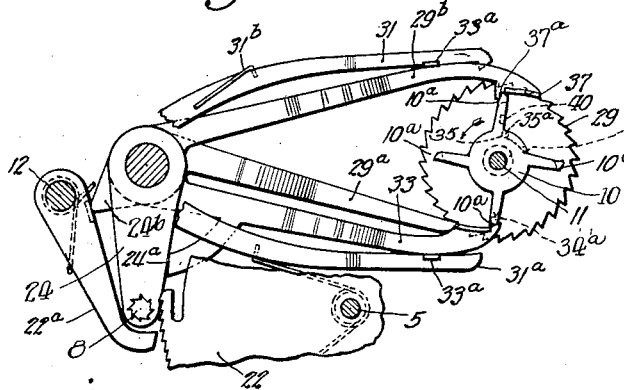
Fig. 6 is a fragmentary vertical sectional view taken substantially in the plane of line 6—6 of Fig. 1 and illustrating the operative connection between the governor element and the drive element.

My improved speedometer comprises in its preferred form, an annular, cup-shaped casing 1 having a rear wall 1ª and a front closing plate 16 of glass or other transparent material. Said plate 16 is secured in position upon the casing 1 in any suitable way, as by means of a clamp collar 15, which latter serves to hold in position a stationary dial plate 4. A central vertical partition 17 divides the casing into a rear compartment 2 adapted to enclose the operating mechanism, and a forward compartment 3 adapted to contain a suitable odometer, not herein shown.

Figure 8:
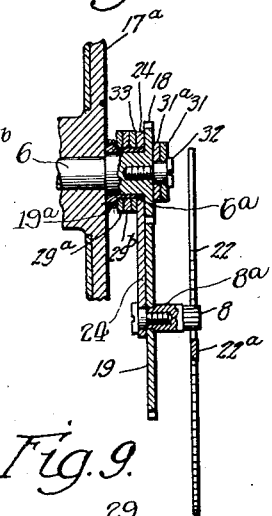
Fig. 8 is a fragmentary vertical sectional view taken in the plane of line 8—8 of Fig. 2.

The rear wall of the casing has secured upon its inner side a base plate 17ª which has a rearwardly extending projection 6ᵈ providing a bearing for a shaft 6 which is adapted to be connected with the element whose speed is to be measured, as, for example, the front steering wheel 20 (Fig. 3) of a motor vehicle. The connection may be of the usual type enclosed within a conduit 20ª. 21 designates generally a coupling between the shaft 6 and said flexible connection, one portion of the coupling being rigidly secured to the shaft 6 by means of a pin 6ᶜ. The shaft 6 projects into the rear compartment 2 (Figs. 1 and 8) and has rigid with its forward end a pinion 18 arranged to mesh with a spur gear 19 journaled in the lower end of an arm 24 which is mounted to swing upon a journal provided by a bushing 6ª (Fig. 8) on the forward end of the shaft 6.

Rigid with the gear 19 is a stud shaft 8ª having a ratchet pinion 8 on its free end which meshes with a toothed disk 22 mounted in the embodiment shown in Figs. 1 to 9, concentrically of the casing upon a shaft 5. One arm 19ª of a spring 19ᵇ, coiled upon the bushing 6ª, tends to swing the arm 24 to move the pinion 8 into operative or driving connection with the disk 22.

Movement of the toothed disk 22 by the pinion 8 takes place against the action of a helically coiled spring encircling the shaft 5 and having one arm fastened to the disk and another arm 25ª which is utilized for another purpose hereinafter set forth. Reverse movement of the disk is normally prevented by a holding pawl 22ª mounted on a stem 12 extending between the plate 17ª and the dial plate 4. A spring also mounted on this stem 12 has an arm 31ᶜ tending to move the holding pawl into engagement with the disk 22. By a means to be later described, the pawl is periodically actuated to release the disk for movement by its spring into its initial position determined by a stop pin 26ª carried by the plate 17 and adapted to be engaged by a stop shoulder 26ᵇ on the disk 22. It is to be observed that the arrangement of the ratchet teeth on the pinion 8 and disk 22 is such that a reverse rotation of the pinion will be ineffective to move the disk or injure it in any way; and it will also be noted that if for any reason the pinion should fail to become disengaged from the disk, no injury to the parts can result by reason of the limitation of the teeth on the disk to a portion only of its periphery.

The shaft 5 is journaled at its rear end in the plate 17ª and also in the central partition 17, the forward end of the shaft being extended through the dial plate 4 and carrying at its free end a pointer 4ª adapted to coact with a suitable scale upon the forward face of the dial plate. To accommodate the pointer 4ª, the dial plate 4 and the front plate 16 are spaced apart by means of a suitable ring 15ª.

It will be observed that by virtue of the movable mounting of the ratchet pinion 8 upon the lower end of the arm 24, a disengageable clutch connection is provided between the drive shaft and the indicator means. For controlling this clutch connection I provide a governing means including a shaft 11 arranged to be driven at a substantially constant speed through an operative connection with the drive shaft 6. Said shaft 11 is mounted at its forward and rear ends respectively in the partition plate 17 and the rear plate 17ª, and encircling said shaft is a coiled torsion spring 26, the outer end of which is made fast to a toothed wheel 30ª through the medium of a pin 17ᵇ rigid with the shaft 11 (Fig. 4) and the other end of which is connected by a pin 35ª with a ratchet wheel 29 journaled upon a bushing 28 on the shaft 11. This spring is maintained under substantially constant tension by a winding mechanism actuated from the drive shaft 6, whereby to cause the shaft to rotate at a uniform speed under the control of an escapement mechanism (Fig. 2) of which the wheel 30ª forms a part. Cooperating with this wheel is a holding device 27 comprising a rod 27ª mounted on a shaft 27ᵇ and weighted at each end. The rod 27ª has a U-shaped holding device 27ᶜ adapted to engage with the toothed wheel 30ª.

The means for energizing the spring 26 comprises in the present instance a pair of pawls 31 and 31ª normally tending to move into operative engagement with the ratchet wheel 29 under the influence of suitable coiled springs 31ᵇ and 25ª respectively. These pawls are mounted upon the free end of the shaft 6 eccentrically thereof by means of a stud screw 32 (Figs. 2 and 8), the arrangement being such that the pawls operate successively in the rotation of the shaft to exert respectively a pulling and pushing impulse upon the ratchet wheel 29. This rotation of the ratchet wheel causes it to rotate in a counter-clockwise direction carrying with it the inner end of the coiled spring 26 to place it under tension. Reverse rotation of the ratchet wheel is prevented by means of a holding pawl 29ª which is pivotally mounted upon the bushing 6ª at the forward end of the drive shaft 6, rearwardly of the arm 24 (Fig. 8), the other arm 19ª of the coiled spring also mounted on the bushing 6ª tending to hold this pawl at all times in engagement with the ratchet wheel.

Means is provided for controlling the operation of the actuating pawls 31 and 31ª, and this means is also utilized for the purpose of controlling the clutch connection between the drive shaft and the indicating means, as well as to effect a storage of power in the spring 26 by preventing an unwinding thereof when the drive shaft comes to rest or is reversely actuated. This means will now be described.

Mounted upon the shaft 6 through the medium of the bushing 6ª (Fig. 8) is a pair of levers 33 and 29ᵇ the free ends of which extend to points below and above the shaft 11. The free ends of said levers 29ᵇ and 33 are each arranged to engage a laterally projecting lug 33ª near the free end of each of the pawls 31 or 31ª, whereby to move said levers inwardly toward the shaft 11 through the operation of the springs 31ᵇ and 25ª.

When the levers are in their innermost positions (Fig. 7), the pawls 31 and 31ª are permitted to engage with the teeth of the ratchet wheel 29 to effect the rotation of the latter; but at the end of each rewinding period, the levers 29ᵇ and 33 are simultaneously swung outwardly to carry their respective pawls into inoperative position. This outward movement of the levers is effected by means of one or more cam fingers carried by a disk 34 which is loosely mounted upon the shaft 11 but whose movement is limited by a shoulder 35 (Fig. 2) provided by a recess formed in the periphery of the disk and adapted to be engaged by the forward end of the pin 35ª (Fig. 4). In the present instance I provide four lever actuating cam fingers 34ª, spaced equidistantly about the disk 34, and it will be seen that in the rotation of the ratchet wheel 29, the cam fingers 34ª are likewise rotated through the engagement of the pin 35ª with the shoulder 35 at one end of the recess. In such movement the two fingers which are diametrically disposed, engage simultaneously with flanges 37 carried upon the free ends of each of the levers 29ᵇ and 33, and move said levers and, through the lugs 33ª, the pawls 31—31ª outwardly out of engagement with the ratchet wheel.

In the movement of the cam fingers upon the flanges 37, they engage with inwardly projecting stop lugs 37ª on each of the levers. These lugs serve to limit the movement of the cam fingers and hold the actuating pawls in their outer positions until such fingers may be released from the lugs 37ª and carried out from engagement with the flanges 37 by the continued rotation of the shaft 11 under the action of the spring 26. Such release is accomplished by means of a second set of fingers 10ª, rigid with a disk 10 which is fixed upon the shaft 11. These fingers are also adapted to engage with the flanges 37 but are made sufficiently longer than the fingers 34ª, to move the levers far enough to permit the fingers 34ª to escape past the stop lugs 37ª. As the fingers 10ª thus ride beneath the flanges 37, a laterally extending projection 40 on one of said fingers engages one of the fingers 34ª at 38 (Fig. 2) and positively moves the disk 34 whereby to carry the fingers 34ª out from engagement with the flanges 37 while the ratchet wheel remains stationary. Such movement of the fingers on the disk 34 relative to the ratchet wheel 29 is permitted by reason of the loose connection between the disk 34 and said wheel afforded by the pin 35ª operating in the cutaway portion or recess in the periphery of the disk 34.

Figure 7:
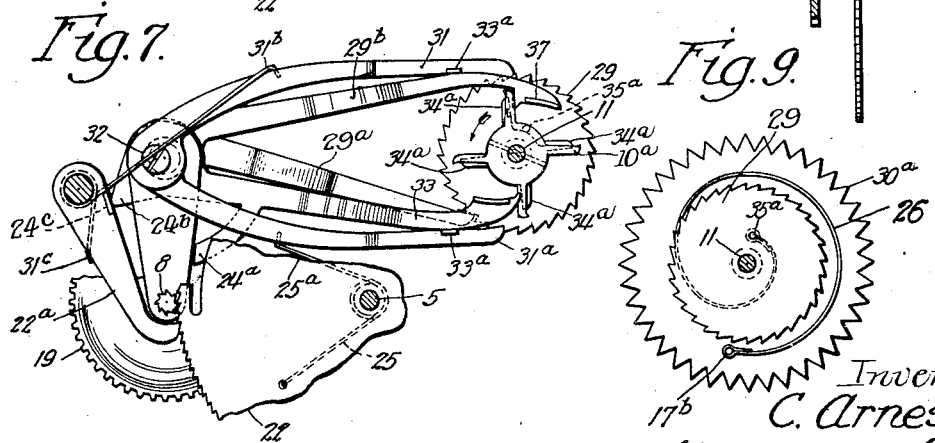
Fig. 7 is a similar view but with the parts in a somewhat different position.
Figure 9:
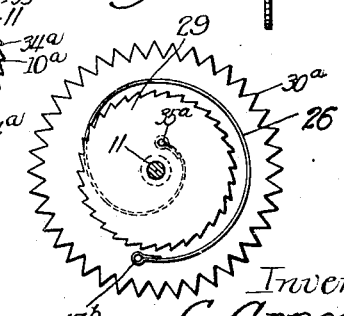
Fig. 9 is a fragmentary vertical sectional view taken in the plane of line 9—9 of Fig. 4.

Obviously the levers 29ᵇ and 33 are now permitted to move inwardly to the position shown in Fig. 7, whereupon the actuating pawls 31 and 31ª re-engage the ratchet wheel 50 and in their reciprocation effect a movement of the pin 35ª, increasing the tension upon the spring until the actuating pawls are again rendered inoperative by the cam fingers on the disk 34.

It will be observed that by the provision of four fingers upon the disks 34 and 10, the actuating pawls 31 and 31ª are moved into and out of engagement with the ratchet wheel 29 four times for each revolution of the ratchet wheel, with the result that each operation of the actuating pawls places a relatively small additional tension upon the spring. One advantage in this arrangement is that the spring is maintained almost under constant tension, being permitted to unwind only a quarter of a revolution between each tensioning operation. A further advantage is that the tension placed upon the spring at any time is never sufficiently great to cause more than a slight frictional engagement between the actuating pawls and the ratchet wheel, rendering it less difficult to disengage the latter. It will also be apparent, however, that the disengagement of the pawls is effected by power derived from the drive shaft through the cam fingers on the disk 34, which latter is actuated by the pin 35ª rigid with the ratchet wheel 29, the spring 26 being depended upon merely to carry the fingers 10ª, into engagement with the flanges 37 to release the fingers 34ª from the stop shoulders 37ª.

When the vehicle to which my speedometer is applied is brought to rest, it is essential, if the speedometer is to be capable of functioning upon a restarting of the vehicle, that the spring 26 be prevented from unwinding. As above indicated, this result is accomplished by the construction of the control mechanism for the actuating pawls. Thus referring to Figs. 2 and 4, it will be apparent that upon a stoppage of the drive shaft 6, the actuating pawls 31 and 31ª will have ceased to rotate the ratchet wheel 29 whereby to move the pin 35ª and thus effect a winding of the spring. Reverse rotation of the ratchet wheel 29 is prevented by the holding pawl 29ª, so that the only other movement that can take place is the movement of the outer end of the spring secured by the pin 17ᵇ to the toothed wheel 30ª. Movement of the wheel 30ª, however, which it will be remembered is fast upon the shaft 11, will be limited by the operation of the finger 10ª first into engagement with the finger 34ª, carrying the latter with it until the pin 35ª is engaged by the shoulder 35ᵇ formed by the right-hand end of the recess in the disk 34. The winding mechanism thus remains idle until the vehicle is again moved forwardly, when the actuating pawls resume their operation of energizing the spring.

To render it impossible for the actuating pawls to be maintained in their inoperative positions after the vehicle is brought to a stop, the length of the recess in the periphery of the disk 34 is made such as to permit the spring to move the finger 34ª through the finger 10ª, out from beneath the flange 37, should the finger 34ª happen to stop immediately after engaging with the flange 37 sufficiently to disengage the actuating pawls. On the other hand, if the fingers 34ª have not moved to disengage the actuating pawls, the construction of the ends of the fingers 10ª is such as to engage with the free ends of the flanges 37 to prevent further movement of said fingers 10ª. In other words, the arrangement is such that if the drive shaft should cease operation after the actuating pawls have been disengaged, then the spring is permitted to operate to effect the re-engagement of the pawls with the ratchet wheel; and if the pawls have not been moved into inoperative position by the advance movement of the fingers 34ª, then the fingers 10ª will act to prevent the disengagement of the pawls until the drive shaft is again set in motion.

It may here be observed that in the assembling of the parts an initial tension is placed upon the spring 26 such that it will be capable of moving the fingers 10ª relative to their flanges 37 to effect the release of the fingers 34ª and the consequent re-engagement of the actuating pawls with the ratchet wheel. The tension placed upon the spring by the winding mechanism is in addition to this initial tension.

As already indicated, the clutch connection between the drive shaft and the indicating means is arranged to be controlled also by the governing means which controls the winding of the spring. To this end I provide upon one of the controlling levers, herein the lever 33, a depending arm 24ª adapted to engage with the arm 24 carrying the ratchet pinion 8 to effect the disengagement of said pinion upon the movement of said lever 33 into inoperative position. This disengagement of the pinion 8 occurs against the action of the spring 19ª and in the movement of the lever 33 by the fingers 10ª, which, it will be remembered are fast upon the shaft 11 and thus move at a uniform speed. To prevent the disengagement of the pinion 8 by the fingers 34ª moving with the ratchet wheel 29, the lower end of the arm 24ª is normally spaced from the arm 24 as shown in Fig. 7. As will be presently more fully set forth, the arrangement is such that in the initial portion of the movement of the fingers 10ª relative to their flanges 37, the pinion 8 is disengaged from the disk 22. In the final portion of such movement the indicator is permitted to return to its zero position (determined by the stop pin 26ª and the shoulder 26ᵇ of the disk 22), under the action of the spring 25. The means for accomplishing this latter result comprises a cam member 24ᵇ on the lever 33, adapted to engage with a lug 24ᶜ upon the holding pawl 22ª for the disk 22.

It will be apparent from the foregoing that in the embodiment illustrated in Figs. 1 to 9, the disk 22 is operated through a direct connection with the drive shaft 6, and that the duration of the successive operating periods of the disk is uniform, being under the control of the fingers 10ª rigid with the shaft 11 which rotates at a constant speed. It will also be seen that while the operating periods are of uniform length, the spring rewinding periods vary in length depending upon the speed of the vehicle, but are always of the same duration for given speeds of the vehicle. For example, with the present arrangement, when the vehicle is traveling at a rate of sixty miles per hour, the rewinding period is equal to one-eighth of a second, and if the vehicle is traveling at a speed of thirty miles per hour, the rewinding period is equal to one-fourth of a second. Because this rewinding period is always the same at a given speed of the drive means, the operating mechanism may be proportioned and arranged, if so desired, so that the indicator means is actuated by the constantly driven shaft 11 during the rewinding periods, a reversal of the arrangement above set forth, as will hereinafter more fully appear in connection with Figs. 15 to 17.

Referring now to the operation of the device in the form shown in Figs. 1 to 9, the ratchet wheel 29 of the spring-winding mechanism is arranged to be rotated one revolution in sixteen seconds, and since two actuating pawls 31 and 31ª are employed, operating successively in each revolution of the drive shaft, thirty-two teeth are provided on the ratchet wheel. Moreover, said pawls are moved into and out of engagement with the ratchet wheel once for each one-quarter of a revolution thereof or once in four seconds. This four seconds period is in the present instance so divided up that during the first two seconds of each period the ratchet pinion 8 is in operative engagement with the toothed disk 22. Consequently, the indicator 4ª is connected with the drive shaft for positive movement thereby during the initial one-eighth portion of the period. At the end of this initial one-eighth portion, the cam fingers 10ª engage with the flanges 37 on the levers 29ᵇ and 33, so that at the beginning of the succeeding or third second of the period the ratchet pinion 8 is disengaged from the disk 22. The latter consequently comes to rest in its advanced position so that the indicator 4 remains stationary for approximately one second or until one of the cam fingers 10ª in its final travel upon the flange 37 of the lever 33 operates said lever and thereby the cam member 24ᵇ, to effect the disengagement of the pawl 22ª from the disk 22. The final or fourth second of the period is therefore provided to effect the return of the indicating means to zero position for speed correction purposes.

It will be remembered that upon the disengagement of the fingers 34ª from the flanges 37, through the operation of the fingers 10ª, the actuating pawls are permitted to re-engage the ratchet wheel to resume the operation of tensioning the spring. At the same time the ratchet pinion 8 is moved by the operation of the spring 19ª into the re-engagement with the disk 22, and the holding pawl 22ª is also moved by the spring 31ᶜ into re-engagement with the toothed disk 22. The foregoing operation is then repeated during the next four seconds period.

It will be noted that while I thus utilize the cam fingers 10ª of the governing means for controlling the connection between the indicating means and the drive shaft, the fingers 34ª operate independently of this last mentioned control. Thus their only function is to make the spring tensioning operations at all speeds uniform. Thus referring to Fig. 7, upon the disengagement of the fingers 34ª from the flanges 37, the actuating pawls immediately engage with the ratchet wheel and continue to operate until the movement of such fingers is limited by the lugs 37ª, after having traveled through a one-quarter turn (Fig. 2). Consequently the same amount of tension is placed upon the spring during each four seconds period regardless of the speed of operation of the vehicle; and as a result, the spring is maintained under substantially constant tension being maintained at all times at least three-quarters strength.

Obviously the gearing connection between the drive shaft and the indicator means is so proportioned and coordinated with the scale on the main dial that the dial properly registers the speed at which the vehicle is traveling. Herein the drive shaft 6 rotates at a speed of 1024 revolutions per mile of travel, and the segment formed by the teeth on the disk 22 and the ratchet pinion are so arranged that in eight complete revolutions of the pinion the disk is moved through 180 degrees. The scale on the dial is accordingly arranged to register sixty miles in this movement.

In the embodiment of the invention illustrated in Figs. 10 to 14, I have shown in place of the indicating pointer 4ª, a disk 4ª′ (Fig. 12) coacting with a stationary pointer 4′ on a stationary plate corresponding to the dial plate 4. This requires the location of the shaft 5 slightly below the center of the casing, an opening 4ᵇ being provided in the front plate 4 substantially centrally thereof to expose the movable dial 4ª′.

In this embodiment also I show an arrangement in which only one actuating pawl 31ª′ is employed, the pawl 29ª′ constituting a holding pawl corresponding in function to the pawl 29ª in the first embodiment. Because of the use of one actuating pawl I arrange to drive it at twice the speed of the corresponding pawl 31ª in Figs. 1 to 9. To this end I provide on the drive shaft 6, a gear 18′ meshing with a pinion 18ª on a stationary shaft 12′. Said pinion 18ª operates the gear 19′ for rotating the pinion 8, and the pawl 31ª′ is mounted eccentrically on the pinion 18ª. In other respects this mechanism is substantially similar to the embodiment above fully described.

Figure 15:
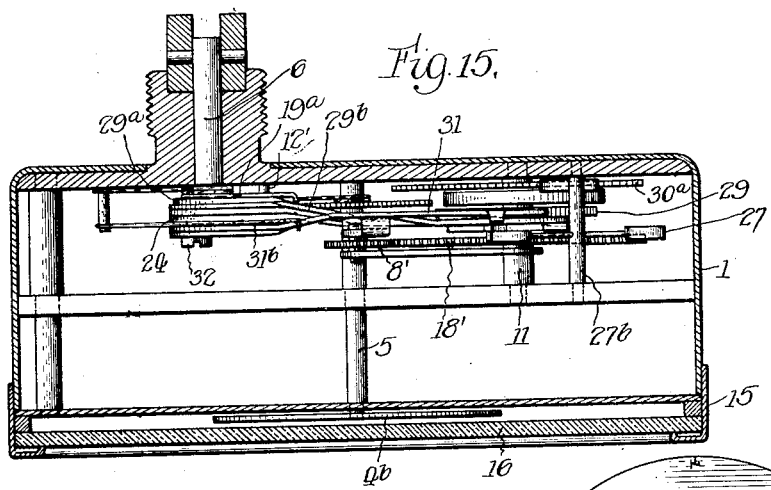
Fig. 15 is a horizontal sectional view of still another embodiment.
Figure 17:
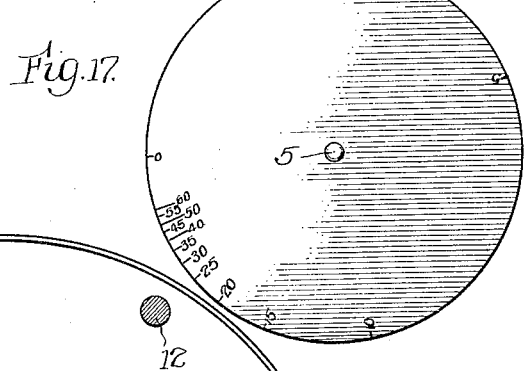
Fig. 17 is an elevational view of the indicator dial employed in this latter embodiment.
Figure 16:
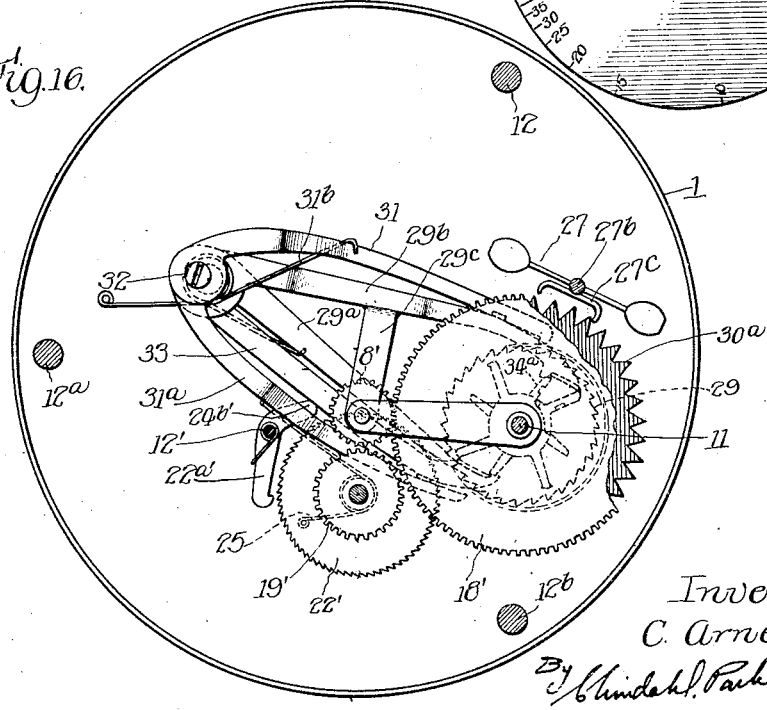
Fig. 16 is a vertical sectional view taken in the plane of line 16—16 of Fig. 15.

Referring now to Figs. 15 to 17, I have in this instance shown the construction and arrangement of the parts which may be employed in the event that it is desired to actuate the indicator during the rewinding periods, which it will be remembered, vary in accordance with the speed of the vehicle but which nevertheless are always the same at given speeds. In this instance the winding means on the control mechanism is substantially the same as in the form above described, with the exception that the movement of the actuating pawl 31ª through the operation of the fingers 34ª is utilized to control the connection between the indicating means and the drive shaft, whereas in the case of the embodiment shown in Figs. 1 to 9, the controlling means for the winding mechanism controls the indicating means by periodically disconnecting the same from the driving means.

The toothed disk 22′ has rigid therewith, in this instance, a gear 19′ which meshes with a pinion 8′ carried by a depending arm 29ᶜ on the lever 29ᵇ. The pinion 8′ is driven by power derived from the drive shaft 6 but through the spring 26 of the governor means. Thus the gear 18′ rigid with the shaft 11 of the winding mechanism, meshes with the pinion 8' so as to drive it constantly at a uniform speed. The arrangement is such that at a predetermined point in the movement of the fingers 34$^a$ into engagement with the flange 37 on the lever 29$^b$, the pinion 8' is disengaged from the gear 19'.

A pawl 22$^{a\prime}$ pivotally mounted upon a stationary shaft 12' is normally spring pressed into engagement with the toothed element 22'. The upper end of this pawl, however, has a cam portion 24$^{b\prime}$ which is disposed in the path of swinging movement of the lever 33 so that when the latter is moved by the fingers 34$^a$ to carry the pawl 31 into inoperative position, the pawl 22$^{a\prime}$ is actuated to release the element 22' for return to zero position under the action of its spring 25. Normally, however, the cam 24$^{b\prime}$ is spaced from the lever 33 so that in the initial portion of the movement of the lever by the fingers 34$^a$, the pawl 22$^{a\prime}$ continues to hold the disk against return movement, the pawl being operated only as the fingers 34$^a$ approach the end of their movement upon the flanges 37.

In this instance, the holding device of the escapement mechanism is positioned above the toothed wheel 30$^a$ thereof, which latter is fast upon the shaft 11 as before.

Referring to Fig. 17, the operating means for the indicator is so proportioned that one-fourth of a revolution of the time shaft 11 and hence of the gear 18', will impart a three-quarters revolution to the dial 4$^b$. And since, when the vehicle is operating at high speed the fingers 34$^a$ will travel through each one-quarter revolution in a very short time, the movement imparted to the dial through the operation of the shaft 11 and gear 18' thereon will be relatively slight. Similarly when the vehicle is traveling at a low speed, the time required for the rewinding operation, that is to say, the time required for the movement of the fingers 34$^a$ through one-quarter of a revolution will be relatively great, so that a correspondingly greater movement will be imparted to the dial. Consequently, the scale on the latter is proportioned accordingly. In the present instance, the arrangement is such that when the vehicle is operating at a speed of one mile per hour, the time required for the movement of the fingers 34$^a$ through one-fourth of a revolution is fifteen seconds, and when the vehicle is operating at a speed of sixty miles per hour, the time required is one-fourth of a second. Thus it will be seen that in this embodiment of the invention, the indicating means is actuated by a driving means rotating at a uniform speed, and under the control of a means actuated at a speed varying with the speed of the vehicle.

It will be apparent that my invention is susceptible of various changes which may be made by those skilled in the art, so that it is to be understood that in the interpretation of the appended claims they are not to be limited to the particular means herein illustrated and described except as may be necessitated by the state of the prior art. The construction employed in the several embodiments shown is of an extremely simple character, so that the device may be manufactured at a relatively low cost. Economy in manufacture, however, is not obtained at a sacrifice of accuracy in registering the speed of a motor vehicle, or the like, for it will be apparent that since the indicating means is driven through connection with the drive shaft, under the control of a governing means which is capable of effectually regulating the periods of operation of the indicating means, accurate results are insured.

I claim as my invention:

1. A speed registering device comprising, in combination, indicating means, a drive element operating at a variable rate of speed, a shaft to be driven at a uniform rate of speed, actuating means for said shaft including a coiled torsion spring, and a device arranged to be operated periodically by said drive element, means for controlling the operation of said actuating means, and means providing a connection between said driven shaft and said indicating means also governed by said controlling means.

2. A speed registering device comprising an element to be rotated at a constant speed, driving means, means for rotating said element including a ratchet wheel arranged to be rotated in one direction only by said driving means, means for preventing a rotation of said wheel in the opposite direction, a spring one end of which is connected to said element and the other end of which is connected to said rotary member, and a device for periodically rotating said ratchet wheel.

3. A speed registering device having a drive element, indicating means arranged to be directly connected to said element for movement thereby, and mechanism for controlling such connection including an actuating spring, means operating periodically adapted to energize said spring in the rotation of said element including a rotary member having means permitting its rotation in one direction only, whereby to prevent an unwinding of the spring upon a reversal of the drive element, and means for stopping the shaft from actuation by said spring upon stoppage of the driving element.

4. A speedometer having an indicating means, an element rotated at a variable rate of speed, and means providing a periodic connection between said indicating means and said element including a governing means having an element to be rotated at a constant rate of speed, a spring for actuating said element, and means for periodically effecting the tensioning of said spring and adapted to operate automatically to prevent a de-energizing of the spring upon the stoppage or reversal of the drive element.

5. A speed registering device having, in combination, indicating means, an element rotated at varying rates of speed depending upon the speed of the part to be measured, a second element, means for rotating said second element at a uniform speed including a spring and an operative connection between said spring and the first element adapted to operate intermittently at intervals depending upon the speed of the first element to energize said spring, and means operating at regular intervals in the operation of the second element to establish an operative connection between said indicating means and the first element.

6. A speed registering device comprising, in combination with an element rotating at a variable rate of speed, indicating means, means providing an operative connection between said indicating means and said element including a spring-pressed actuating member, and means for controlling said connection including a shaft rotatable at a constant rate of speed, and a lever arranged to be periodically operated in the rotation of said shaft and adapted to move said member into inoperative position against the action of its spring.

7. A speed registering device comprising, in combination with an element rotating at a variable rate of speed, indicating means including a toothed segment, means providing an operative connection between said element and said indicating means including a toothed wheel mounted for movement toward and from said segment, a shaft arranged to be driven from said element and having a cam member rigid therewith, and means for controlling the connection between said indicating means and the drive element including a lever arranged to be actuated by said cam member and adapted to move said toothed wheel relative to said segment.

8. A registering device having a shaft to be driven at a constant rate of speed, a spring having one end connected with the shaft, a ratchet wheel loose on the shaft and having the other end of the spring connected thereto, a reciprocatory pawl adapted to engage said ratchet wheel whereby to energize said spring, and means on said shaft operable to control the position of said pawl whereby to effect the periodic energization of the spring.

9. A speed registering device having a shaft to be driven at a constant rate of speed, a spring having one end connected with the shaft, a ratchet wheel loose on the shaft and having the other end of the spring connected thereto, a reciprocatory pawl adapted to engage said ratchet wheel whereby to energize said spring, and means on said shaft operable to control the position of said pawl whereby to effect the energization of the spring a plurality of times in each rotation of the shaft.

10. A speed registering device having a shaft to be driven at a substantially constant speed, means for actuating the shaft including a spring connected therewith, a pawl and ratchet mechanism also associated with the spring to energize it, and means for controlling said mechanism comprising a plurality of cam members operable in each revolution of the shaft to effect the operation of said mechanism a plurality of times.

11. A speed registering device having an element to be driven at a substantially constant speed, and means for actuating said element including a spring having one end connected thereto, a member rotatable relative to said element and having the other end of the spring connected thereto, and means for effecting the periodic movement of said member during each revolution of said element.

12. A speed registering device having an element to be driven at a substantially constant speed, and means for actuating said element including a spring having one end connected thereto, a member rotatable relative to said element and having the other end of the spring connected thereto, and means for effecting the periodic movement of said member during each revolution of said element including a plurality of controlling devices movable with said element and equidistantly spaced thereabout.

13. A speed registering device having an element to be driven, means for driving said element including a spring, a shaft connected with the part whose speed is to be determined and rotated at a variable rate of speed, and a device for tensioning said spring, said device being actuated by said shaft and operating solely under the control of said element for periods of varying duration depending upon the speed of the shaft.

14. A speed registering device having an element to be driven at a substantially constant speed, means for actuating said element including a spring having one end connected thereto, a member loose on said element and having the other end of the spring connected thereto, a part fixed upon said element so as to be rotatable therewith, a second part also mounted on said element and arranged to be moved by the first part, means for rotating said member in one direction to energize the spring, said means being adapted to be controlled by the operation of said parts to move out of and into engagement with said member, and means for holding said member from rotation in the opposite direction.

15. In a registering device, a part to be driven having an actuating spring, means for energizing said spring including a reciprocatory pawl, and means for controlling the operation of said pawl including a cam member operable with said part, and a stationary member operable by said cam member to render the pawl ineffective.

16. The combination of a drive member, a pair of relatively rotatable elements mounted concentrically at one side of said drive member, a spring connecting said elements, a device connected with said driving member for reciprocation thereby and operable to rotate one of said elements whereby to place said spring under tension so as to rotate the other one of said elements, and means operable when said device ceases to reciprocate to stop substantially simultaneously the movement of said other element by said spring.

17. A speed regulating device for motor vehicles and the like comprising, in combination, driving means, indicating means, means providing an operative connection between the indicating means and the driving means, a pair of relatively rotatable elements concentrically arranged, a spring connecting said elements, means providing an operative connection between said drive means and one of said elements whereby to rotate it intermittently and tension said spring, means for holding said rotated element against reverse rotation, means operable in the rotation of said other element to disconnect the indicating means from the driving means, and means operable when the driving means comes to rest to render the spring ineffective to move said other element.

18. A speed registering device having an element rotated at varying rates of speed, and a control device operatively associated with said element and including an element to be driven at substantially constant speed, a spring drive for said element, and a device for energizing said spring drive controlled solely from the second mentioned element and operating at spaced intervals of a length determined by the speed of the first element.

19. A speed registering device having an element to be driven, means for driving said element including a spring, a shaft connected with the part whose speed is to be determined and rotatable at a variable rate of speed, and means actuated by said shaft and controlled solely by said element so as to operate for periods of predetermined duration depending upon the speed of the shaft whereby to energize said spring.

20. A speed registering device having an element to be driven at a substantially constant speed, means for driving said element including a spring, a shaft connected with the part whose speed is to be determined and rotatable at a variable rate of speed, means constantly actuated by said shaft, and cam means actuated solely by said element for controlling the winding of said spring by said constantly actuated means.

21. A speed registering device comprising, in combination, a drive element having a ratchet pinion continuously driven thereby and mounted for swinging movement, indicating means including a toothed member adapted for engagement by said pinion, means tending to hold said pinion in driving connection with said member, means tending to move said member into initial position, a pawl normally engaging with said member to hold it in its advanced position, and governing means operable to disengage said pinion and pawl from said member, said governing means including a lever, cam means operable periodically to swing the lever, and means carried by the lever for independently moving said pinion and said pawl.

22. A speed registering device comprising, in combination, a shaft operating at a variable rate of speed, an element to be driven at a substantially constant speed, indicating means having a disengageable connection with said shaft for movement thereby, means including a spring arranged to be energized in the operation of said shaft to cause said element to rotate at a substantially constant speed, and cam means operating in the rotation of said element to control such connection between said shaft and the indicating means and also to govern the energization of said spring.

23. A speed registering device comprising, in combination, driving means, indicating means, and a governing means for controlling the operation of the indicating means through power derived from the governing means, said governing means including a part to be driven at a substantially constant speed, means including a spring for rotating said part, means operating intermittently for periods determined by the speed of the driving means whereby to maintain the spring under tension, and means controlled by said governing means providing an intermittent connection between said indicating means and said shaft.

24. A speed registering device comprising, in combination, a drive element, indicating means arranged to be periodically connected with said drive element for movement thereby, a pawl arranged to be constantly reciprocated in the operation of the drive element, a ratchet wheel arranged to be actuated by said pawl, a spring having one end connected with said ratchet wheel, a shaft upon which said ratchet wheel is mounted and having the other end of the spring connected thereto, a finger rigid with said shaft and a lever movable by said finger adapted to control the movement of said pawl relative to said ratchet wheel.

25. In a speed registering device the combination of a drive element, a pawl arranged to be continuously reciprocated by said element, a ratchet wheel arranged to be actuated by said pawl, a spring adapted to be tensioned in the operation of said ratchet wheel, a part with which said spring is connected and arranged to be operated thereby, a cam member actuated in the movement of said ratchet wheel, and a lever operable by said cam member to control the movement of said pawl relative to said ratchet wheel.

26. A registering device comprising, in combination, a drive element, a pawl reciprocated in the operation of said element, a ratchet wheel adapted to be actuated by said pawl, a shaft upon which said ratchet wheel is mounted, a spring connecting said ratchet wheel and shaft, cam means operable in the movement of the ratchet wheel whereby to move said pawl out of a normal operative engagement with the ratchet wheel, and cam means movable in the rotation of said shaft whereby to effect the movement of the pawl into engagement with the ratchet wheel.

27. A speed registering device comprising, in combination, a drive element, a pawl reciprocable in the operation of said element, a ratchet wheel adapted to be actuated by said pawl, a shaft upon which said ratchet wheel is mounted, a spring connecting said ratchet wheel and shaft, cam means operable in the movement of the ratchet wheel whereby to move said pawl out of a normal operative engagement with the ratchet wheel, and cam means movable in the rotation of said shaft whereby to effect the movement of the pawl into engagement with the ratchet wheel, said two cam means being adapted to interlock upon a stoppage of the drive element.

28. A speed registering device having, in combination, a drive element, indicating means including a rotary member, a member continuously connected with the drive element, and means for effecting periodically the connection and disconnection of said members comprising a shaft to be driven at a substantially constant speed, an actuating member operatively connected with the drive element, cam means for controlling the operation of said actuating member, and means operable by said cam means to control the connection between said driving and driven members.

29. The combination of two relatively rotatable elements, a helically coiled spring connecting said elements, and means acting at regular intervals to impart successive rotary movements of exactly the same length to one of said elements whereby to actuate the other element through the medium of said spring, said successive movements being less than a complete revolution.

30. The combination of an element to be driven continuously at a uniform rate of speed, of actuating means therefor, and means operating intermittently to impart to said actuating means successive power impulses each of a definite predetermined value and each effecting the movement of said actuating means through less than a complete revolution.

31. The combination with an element to be driven continuously at a substantially uniform speed, of actuating means therefor including a ratchet wheel and a reciprocatory pawl, and means operating to effect the periodic engagement of said pawl with said ratchet wheel whereby to impart to said actuating means successive power impulses each of a definite predetermined value.

32. The combination with a drive element and an element to be driven, of actuating means for the driven element including a ratchet wheel, a pawl operatively connected with said drive element for constant reciprocation thereby, means for effecting the periodic engagement of said pawl with the ratchet wheel whereby to impart successive power impulses to the actuating means each of a predetermined value, and means for preventing the reverse rotation of said ratchet wheel.

33. The combination of two relatively rotatable elements, a spring connecting said elements, and intermittently operating means for imparting a plurality of power impulses to one of said elements during each revolution thereof.

34. The combination of two relatively rotatable elements one of which is a ratchet wheel, a spring connecting said elements, actuating means for rotating the ratchet element in one direction to place said spring under tension, means independent of the actuating means for holding said ratchet wheel against rotation in the opposite direction, and means operable to interrupt the rotation of the other one of said elements by said spring when the actuating means comes to rest.

35. The combination of two relatively rotatable elements concentrically arranged, a spring connecting said elements, a drive element located at one side of said rotatable elements, and means including a pawl eccentrically connected to said drive element so as to reciprocate constantly, said means being adapted to impart successive rotary movements of equal length to one of said elements whereby to actuate the other element through the medium of said spring.

36. The combination of two relatively rotatable elements, a spring connecting said elements, a drive member, means connected with said drive member and adapted to rotate one of said rotatable elements in one direction whereby to tension the spring, means independent of the drive member for holding the last mentioned element against rotation in the opposite direction, and means operating in the movement of the other one of said elements by said spring, to interrupt the unwinding thereof upon a stoppage of the drive member.

37. A speed regulating device comprising, in combination, driving means, indicating means, and a governing means for controlling the operation of the indicating means through power derived from the driving means, said governing means comprising a shaft, a rotary member operatively connected with the driving means, a spring connecting said member and said shaft, a device actuated solely by said shaft for effecting the intermittent operation of said member, and an escapement mechanism including a toothed wheel fast on said shaft.

38. The combination of two relatively rotatable elements, a spring connecting the elements, actuating means including a member having a pivotal mounting at one side of said elements independently thereof, means operable in the movement of said member to impart successive rotary movements to one of said elements, means operable in the rotation of one of said elements to effect the movement of said actuating member into an inoperative position, and means operable in the rotation of the other one of said elements to effect the movement of said actuating member into operative position.

39. A speed registering device comprising, in combination, driving means, indicating means and a governing means for controlling the operation of the indicating means through power derived from the driving means, said governing means comprising a shaft, a rotary member operatively connected with the driving means, a spring connecting said member and said shaft, means for effecting the intermittent operation of said member for periods of predetermined duration depending upon the speed of the vehicle, and means operating under the control of the last mentioned means providing an intermittent connection between said indicating means and said driving means.

40. The combination of two relatively rotatable elements, a spring connecting said elements, a drive shaft located to one side of said elements, and means for successively rotating one of said elements including a pair of reciprocatory members eccentrically mounted on the drive shaft so as to be reciprocable in the rotation thereof, and a ratchet wheel rigid with one of said elements and adapted to be engaged upon diametrically opposite sides by the respective actuating members.

41. The combination of two relatively rotatable elements, a spring connecting said elements, means adapted to impart rotary movements to one of said elements including an actuating member, and means for controlling the actuating member including a pair of cam fingers movable with respect to said two elements and being capable of a limited movement relative to each other.

42. The combination of two relatively rotatable elements, driving means, a spring connecting said elements, means actuated by the driving means adapted to drive one of said elements in one direction whereby to rotate the other element through the spring, means for preventing a reverse rotation of the first or driven element, and means adapted to interrupt the movement of said other element by the spring upon the cessation of movement of the drive means.

43. The combination of two relatively rotatable elements, a spring connecting said elements, and intermittently operating means for moving one of the elements to place said spring under tension, said means comprising two separate cam means respectively movable with the two elements and adapted to limit each operation of said intermittently operating means to less than a complete revolution of the element rotating thereby.

44. A speed registering device having, in combination, two relatively rotatable elements, a spring connecting said elements, means for rotating one of the elements to place said spring under tension, and governing means including a pair of coacting parts one of which has a lost-motion connection with the rotated element and the other a connection with the spring-actuated element.

45. The combination of two relatively rotatable elements, a spring connecting said elements, and an intermittently operating means to move one of the elements to place said spring under tension, said means including a continuously operating actuating member, and two separate cam means for controlling said actuating member, said cam means having a limited relative movement with respect to each other whereby to prevent an unwinding of the spring when said actuating member comes to rest.

46. The combination of two relatively rotatable elements, a spring connecting said elements, intermittently operating means for moving one of the elements to place said spring under tension including a pawl and ratchet mechanism, means for periodically rendering said mechanism ineffective, and means for preventing an unwinding of the spring when the pawl and ratchet mechanism ceases to operate, said means being independent of the connection of said actuating means with a source of power.

47. The combination of two relatively rotatable elements, a spring connecting said elements, intermittently operating means for moving one of the elements to place said spring under tension including a drive element, an actuating member continuously operated by said drive element, and means operable when said actuating member is either associated or disassociated from the element driven thereby, to prevent the unwinding of the spring upon the stoppage of the drive element.

48. A speed registering device having, in combination, indicating means including a rotary member having a spring for moving it in one direction, a device for holding it against reverse rotation, driving means having a member adapted for operative engagement with said rotary member, a pair of relatively rotatable elements having a spring connection, means operable by the driving means to tension said spring, and a single means for controlling the connection between said driving member and said rotary member and for releasing said holding device.

49. A speed registering device having, in combination, indicating means including a rotary member having a spring for moving it in one direction, a device for holding it against reverse rotation, driving means having a member adapted for operative engagement with said rotary member, a pair of relatively rotatable elements having a spring connection, means operable by the driving means to tension said spring, and a single means for controlling the connection between said driving member and said rotary element, for releasing said holding device and for controlling the spring tensioning means.

50. In a speed registering device, the combination of an indicator, a variable speed drive element, a constant speed governing element having control means operating in the rotation of the element to effect the periodic connection and disconnection of the indicator with the variable speed element, said constant speed element including an actuating spring, and means driven from said variable speed element to tension said spring, the spring tensioning means being also rendered periodically effective by said control means.

In testimony whereof, I have hereunto affixed my signature.

CHARLOTTE ARNESEN.

CERTIFICATE OF CORRECTION.

Patent No. 1,737,400. Granted November 26, 1929, to

CHARLOTTE ARNESEN.

It is hereby certified that error appears in the printed specification of the above numbered patent requiring correction as follows: Page 6, line 105, claim 2, strike out the words "rotary member" and insert "ratchet wheel to drive the latter, and means operating upon a stoppage of the driving means for stopping said element against continued movement by said spring"; same page, line 111, claim 3, after the word "including" insert the words "a shaft having"; and that the said Letters Patent should be read with these corrections therein that the same may conform to the record of the case in the Patent Office.

Signed and sealed this 14th day of January, A. D. 1930.

(Seal)

M. J. Moore,
Acting Commissioner of Patents.